March 14, 1961 W. E. TAYLOR ET AL 2,975,036

CRYSTAL PULLING APPARATUS

Filed Oct. 5, 1956 4 Sheets-Sheet 1

INVENTORS
WILLIAM E. TAYLOR
RALPH F. RUSSI
BY
Mueller and Aichele
ATTORNEYS

INVENTORS
WILLIAM E. TAYLOR
RALPH F. RUSSI
BY Mueller and Aichele
ATTORNEYS

March 14, 1961 W. E. TAYLOR ET AL 2,975,036

CRYSTAL PULLING APPARATUS

Filed Oct. 5, 1956 4 Sheets-Sheet 3

INVENTORS
WILLIAM E. TAYLOR
RALPH F. RUSSI

BY Mueller and Aichele

ATTORNEYS

March 14, 1961 W. E. TAYLOR ET AL 2,975,036

CRYSTAL PULLING APPARATUS

Filed Oct. 5, 1956 4 Sheets-Sheet 4

INVENTORS
WILLIAM E. TAYLOR
RALPH F. RUSSI

BY Mueller and Aichele

ATTORNEYS

United States Patent Office 2,975,036

Patented Mar. 14, 1961

2,975,036

CRYSTAL PULLING APPARATUS

William Edwin Taylor and Ralph F. Russi, Phoenix, Ariz., assignors to Motorola, Inc., Chicago, Ill., a corporation of Illinois Filed Oct. 5, 1956, Ser. No. 614,119

4 Claims. (Cl. 23—273)

The present invention relates to a method and an apparatus for pulling semiconductor crystals or the like, by dipping a seed crystal into a semiconductor melt and then slowly withdrawing the seed crystal.

In the present-day semiconductor art in the construction of transistors, rectifiers and the like, a semiconductor crystal wafer of germanium or silicon is used having a selected impurity alloyed therein so that the crystal may exhibit positive or negative conductivity characteristics, whichever is required. For example, when a positive or p-type semiconductor crystal is needed, an element is selected from column III of the periodic table to constitute the impurity, these elements being, for example, boron, aluminum or indium (indium being preferred at present). On the other hand, when a negative or n-type semiconductor crystal is desired, a suitable element from the nitrogen group is selected as the impurity; these being, for example, antimony, bismuth, arsenic or phosphorous (antimony being preferred at present).

In alloying the extremely minute amount of the selected impurity into the crystal to enable it to exhibit the required conductivity characteristics, it is usual to melt together a quantity of pure, essentially intrinsic, semiconductor material and an additional quantity of the same semiconductor material with a high concentration of the selected impurity into a melt, this being done in an atmosphere of an inert gas (such as argon). This allows the overall melt to have the desired minute trace of the impurity alloyed therein. A seed crystal is then moved into the crucible, dipped into the molten mass, and slowly withdrawn from the molten mass and the semiconductor material crystallizes onto the seed to form a solid crystal column having the desired impurity concentration and being of the desired conductivity type. This technique is known and is usually designated as crystal pulling.

There have been several unsolved problems in crystal-pulling art prior to the present invention. One such problem has been the long period of time required between drawing crystals because each pulled crystal and the entire crystal-pulling furnace had to be cooled from the pulling temperature to a temperature at which the pulled crystal would not oxidize when withdrawn from the furnace into the atmosphere, and the furnace then had to be recharged with semiconductor material and brought up to the pulling temperature again. With previously known pulling furnaces, it was impossible to remove the pulled crystals from the furnace and introduce semiconductor material to replenish the supply without shutting down the furnace. It was also difficult to restrict heat losses in the furnace from the crucible containing the molten semiconductor material. Excessive vibration of the pull rod by mechanisms lifting the pull rods during pulling of crystals reduced the perfection of the crystals.

In pulling a crystal, only a portion of the impurity in each increment of the portion of the melt forming on the bottom of the crystal is formed into the crystal and the rest of the impurity stays in the melt. Thus, as the melt is depleted by the crystal, the impurity concentration of the melt increases, causing the impurity concentration of the crystal to increase. An increase in impurity concentration in the crystal decreases resistivity. In the past, it has been difficult to avoid large resistivity variations along the length of each pulled crystal.

To form a large crystal, it is desirable to have a deep melt of semiconductor material, but in the past it has been difficult to have a deep melt of semiconductor material because the hydrostatic pressure of molten semiconductor material caused it to seep through the bottom of the crucible containing the melt.

One object of the invention is to provide a crystal pulling method and apparatus capable of producing large crystals in which resistivity variations along the length of each crystal is minimized.

Another object of the invention is to provide such improved apparatus in which seepage of the melt through the bottom of the crucible is prevented.

Yet another object of the invention is to provide crystal-pulling apparatus in which a crystal may be removed from and a charge inserted into a furnace thereof without introducing air into the furnace.

Still another object of the invention is to provide crystal-pulling apparatus which will produce a plurality of crystals without closing down the apparatus between successive pulling operations.

A further object of the invention is to provide vibrationless crystal-pulling apparatus.

A still further object of the invention is to provide a crystal-pulling furnace in which heat losses from a crucible thereof are minimized.

Yet another object of the invention is to provide a crystal-pulling furnace in which heating of a crucible thereof is precisely controlled.

One feature of the invention is the provision of a crystal-pulling furnace having an air lock slidable up a pull rod of the furnace to provide access to a pulled crystal.

Yet another feature of the invention is the provision of a graphite support for a crucible to seal the bottom end of the crucible and permit deep melts to be used therein.

Another feature of the invention is the provision of a method of pulling a crystal in which only a fraction of the total melt is formed into the crystal in order to minimize resistivity of the crystal along its length.

One other feature of the invention is the provision of an improved crystal-pulling apparatus which includes an air-lock arrangement that permits the crystal to be pulled from the molten mass out of the crucible, a new charge to be introduced into the crucible, a new seed crystal to be inserted therein, and subsequent crystals to be pulled, all without the necessity of closing down the apparatus between consecutive pulling operations.

Still another feature of the invention is the provision of a crystal-pulling furnace having a pull rod driving mechanism mounted low on the furnace so as to minimize vibration of the pull rod during crystal pulling.

Yet another feature of the invention is the provision of a crystal-pulling furnace having a shield extending above a crucible thereof to reduce heat losses from the upper portion of the crucible.

A further feature of the invention is the provision of a crystal-pulling furnace provided with a graphite resistance heater in the form of a double-helix and electrodes supporting the heater by flanges on the heater. There also may be provided a crucible support precisely positioning a crucible in the helix so that optimum temperature conditions are provided for the helix.

The invention provides apparatus for pulling semiconductor crystals comprising a furnace having an opening at the top thereof through which a crystal pulling rod may pass to position its lower end in the interior of the furnace near the upper surface of a melt of semiconductor material such as germanium or silicon. The pull rod is mounted on an elevator carriage which raises and lowers the pull rod under the control of an operator and the drive for the elevator carriage is a feed screw by an electric motor drive which is mounted low on the apparatus so that vibration of the pull rod from raising and lowering of the carriage is minimized. A friction drive for turning the pull rod during crystal pulling is mounted on the carriage. An air-lock on the rod is selectively coupled to the cover to seal the opening and is movable to an elevated position making the lower end of the pull rod accessible, and a valve closure member closes the opening when the air-lock is raised so that the furnace need not be shut down between crystal-pulling operations. A seed-holding chuck and a tong-type charge-holder are alternately attached to the pull rod to alternately pull a crystal and charge the furnace with additional semiconductor material.

The upper end of a quartz crucible supports a cylindrical quartz shield which reduces loss of heat from the region immediately above the melt, and the crucible and shield are located within a double helix graphite resistance heater. A cylindrical support positions the crucible in a cup-shaped vessel surrounding the heater, and a graphite plate on the support fits against the bottom of the crucible to freeze the initial seepage of semiconductor material through the quartz crucible and to prevent further seepage even though the melt is deep in the crucible. The length of the support determines the position of the crucible along the heater and is such that the crucible is coextensive with the hottest portion of the heater. A cylinder surrounds the vessel to form another heat barrier with insulation positioned therebetween. The cylinder is of electrical insulation and supports electrode plates on which flanges of the heater rest and are supplied with electrical current.

The crucible holds a large quantity of semiconductor material so that during the pulling of a crystal, which is very large in comparison to such crystals as normally pulled in this art, only a fraction of the total semiconductor material in the melt is formed into the crystal. This relative difference between the volume of metal in the completed crystal, and the remaining volume of metal in the crucible causes the variation in the impurity concentration of the crystal along its length to be minimized. Consequently, wafers sliced transversely of the crystal have impurity concentrations within narrow limits. This facilitates formation of uniform semiconductor devices from such wafers.

Figure 1:
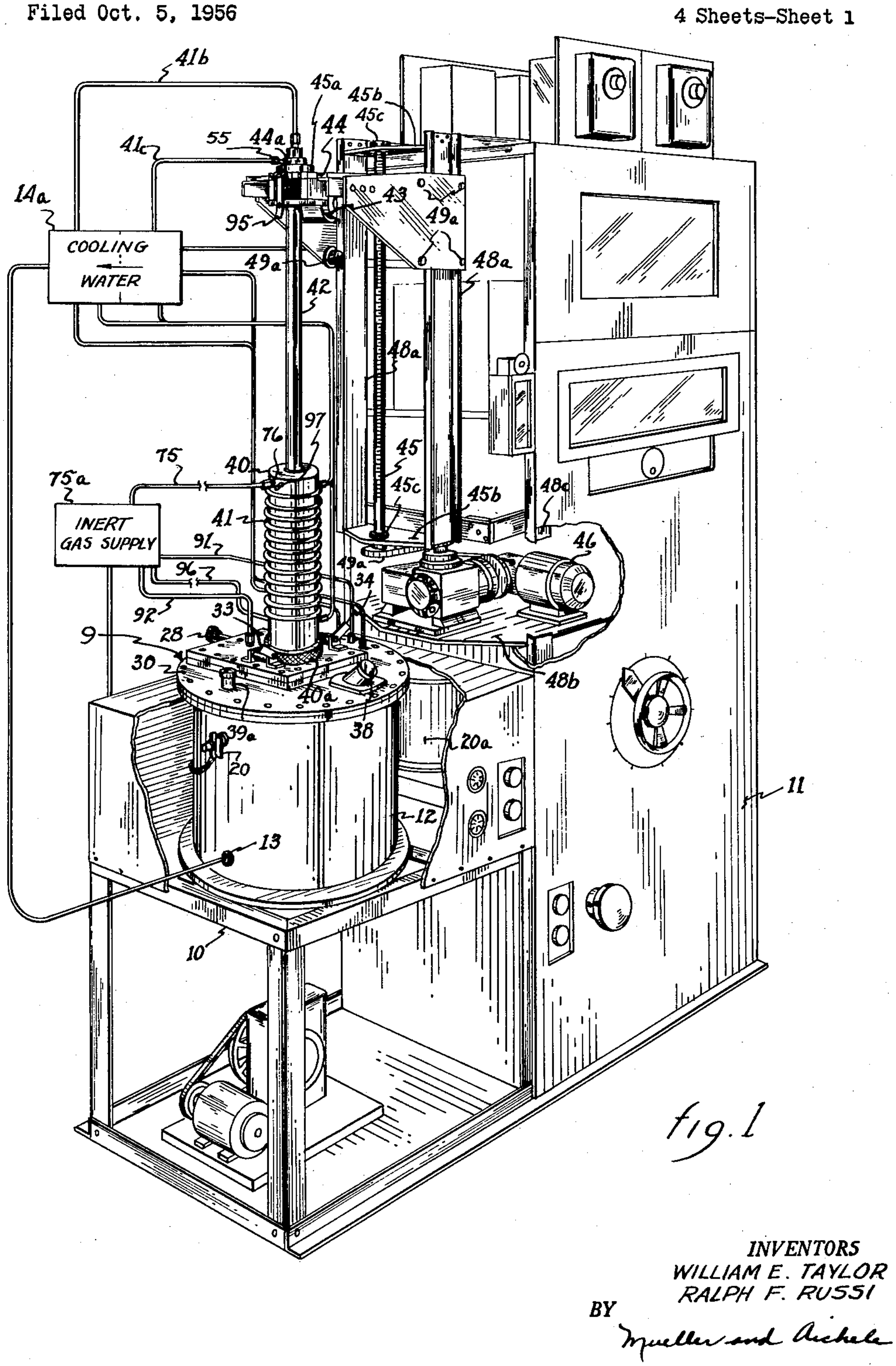
Fig. 1 is a partially schematic, perspective view of the crystal-pulling apparatus forming one embodiment of the present invention with portions thereof broken away.
Figure 2:
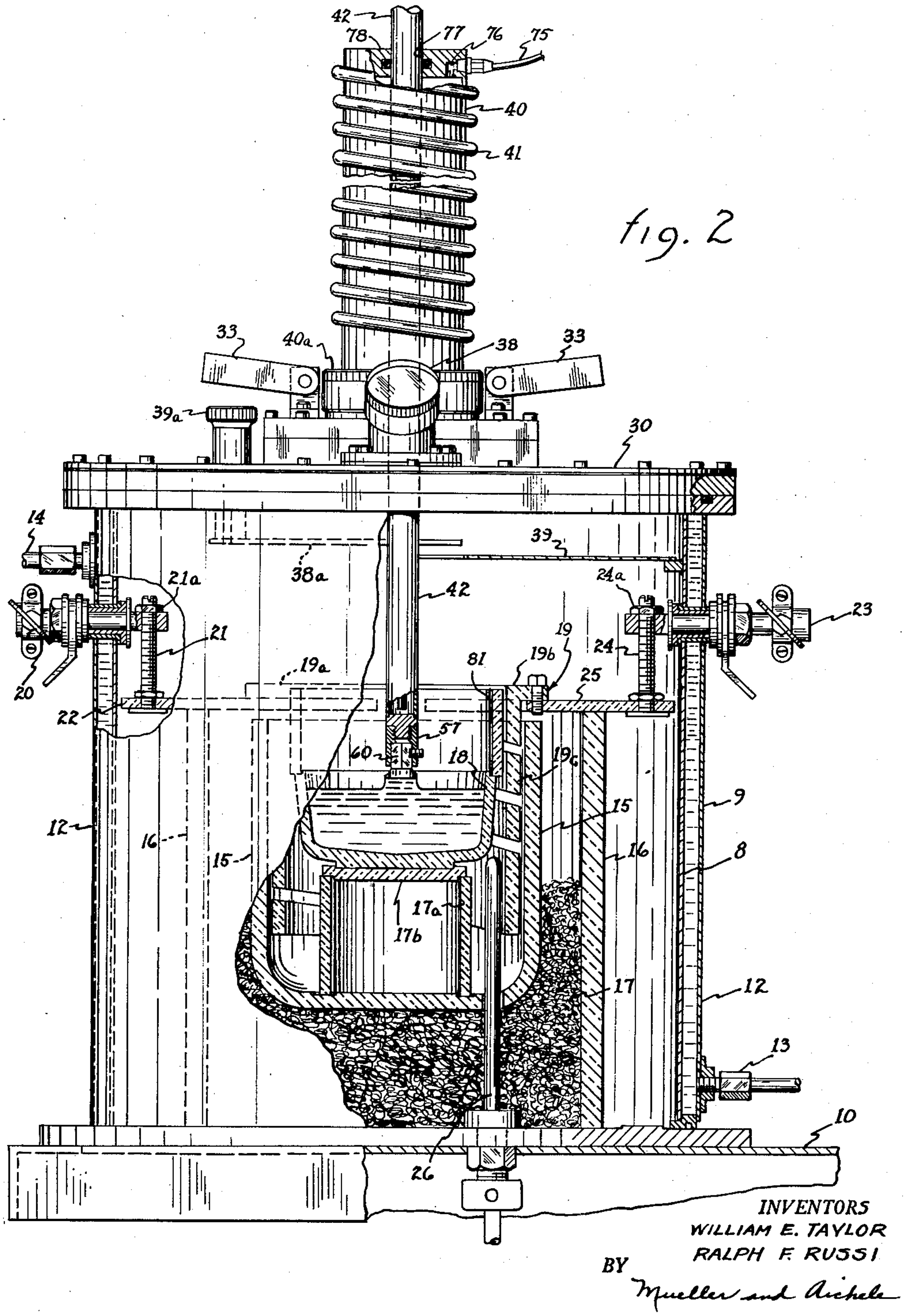
Fig. 2 is an enlarged view of the furnace portion of the apparatus, partly in section.

More specifically, the improved crystal-pulling apparatus of the present invention includes a frame 10 (Figs. 1 and 2) supporting a control panel 11 and which also supports a cylindrical outer housing 12 of a furnace 9. A hollow pull rod 42 is mounted on and is selectively raised and lowered relative to the furnace 9 by an elevator carriage 43 slidable on vertical guides **48*a*. The carriage 43 is driven by a vertical feed screw 45 mounted by rotary-and-thrust bearings 45*c* supported by fixed plates 45*b* at the ends of the guides 48*a*. The pull rod is rotatable and slidable in an air-lock chamber or tower 40 detachably mounted on the top of the furnace 9**, and serves to pull a crystal from the furnace and to recharge the furnace with semiconductor material as described below.

The housing 12 of the furnace 9 may be composed of stainless steel and has a pair of spaced walls 8 and 9 (Fig. 2) adapted to circulate water therebetween so that the housing functions as a water jacket for the apparatus, the water entering the jacket through an inlet 13 and leaving the jacket through an outlet 14. The water is supplied by a suitable source **14*a* shown diagrammatically in Fig. 1. A cup-shaped vessel 15 forms a primary thermal shield or barrier and a cylinder 16 forms a secondary thermal shield or barrier. The vessel 15 and the cylinder 16 are composed of quartz or other suitable heat-resistant material, and are supported within the outer housing 12 in essentially coaxial relation with one another and with the housing. The vessel 15 is supported within the housing on a quantity of powdered heat resistant material 17 such as powdered graphite and which is presently known to the art by the trade name "Norblack." This powdered substance is piled on the bottom of the outer housing and between the elements 15 and 16 so that the barrier 15 is supported thereon and the elements 15 and 16** spaced from one another.

Figure 5:
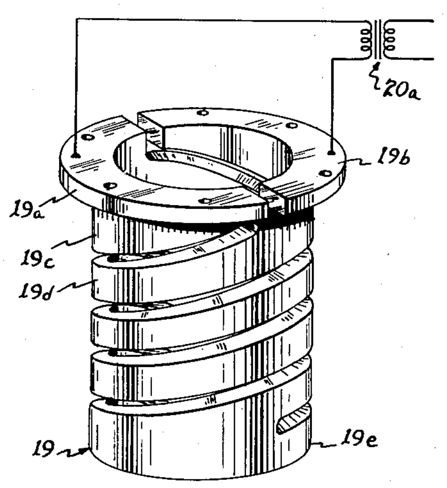
Fig. 5 is an enlarged perspective view of a resistance heater of the furnace shown in Fig. 2 with a power supply therefor shown schematically.

A cylindrical support **17*a* for a quartz crucible 18 is positioned within the vessel 15 and a graphite plate 17*b* is in face-to-face contact with the crucible and rests on the top of the support 17*a*. The plate 17*b* freezes the semiconductor material first seeping through the bottom of the crucible to prevent further seepage therethrough. This permits deep melts of semiconductor material in the crucible. A double-helix graphite resistance heater 19 is interposed between vessel 15 and crucible 18 to heat the crucible and its contents. Electrical energy from a transformer 20*a* shown in Fig. 5 forming a portion of a controller of a known type is supplied for one end of the heater 19 through a terminal 20 and a connecting electrode 21 electrically connected to an arcuate horizontal electroconductive plate 22 of heat resistant electroconductive material such as graphite, supported on the top of cylinder 16. The other end of heater 19 is connected to the power source through a terminal 23, a connecting electrode 24 and an arcuate horizontal electroconductive plate 25 also supported by the cylinder 16. Heavy current flowing through the resistance heater 19 generates heat. The heater 19 has flanges 19*a* and 19*b* (Fig. 5) bolted to the plates 22 and 25 to form both mechanical and electrical connections therewith. The electrodes 21 and 24 are threaded and are supported adjustably on terminals 20 and 23 by nuts 21*a* and 24*a*. These elements and the cylinder 16 precisely position the heater 19 in the furnace. Flanges 19*a* and 19*b* are integral with parallelly disposed resistance helices or legs 19*c* and 19*d*, respectively. The helices 19*c* and 19*d* are connected integrally together at their lower ends by ring portion 19*e*. The transformer 20*a* of the controller supplies power to the flanges of the heater 19 through electrode elements 20, 21, 22, 23, 24 and 25 (Fig. 2), and the current travels serially between the flanges 19*a* and 19*b*, through first one of the helices 19*c* and 19*d* (Fig. 5), then the connecting ring portion 19*e*, and then the other helix 19*c* or 19*d*. The current heats the heater 19, which radiates the heat to the crucible 18 and to a cylindrical quartz shield 81** resting on the lip of the crucible. The portions of the helices 19c and 19d between the ends thereof have the lowest cross-sectional areas of the current path and therefore the highest resistance so that the greatest heat is produced adjacent to the crucible. The heater also is spaced very close to the crucible. In one successful example, the heater 19 had an inner diameter of five and eleven-sixteenths inches and the outer diameter of the crucible was five and one-quarter inches so that the spacing is seven-thirty seconds of an inch. The height of this crucible was two and seven-sixteenths inches and the inner diameter four and three-fourths inches, while the height of the heater was six and seven-sixteenths inches. The crucible 18 also was at the mid-point of the heater so that it was at the hottest portion of the heater.

The double helix heater 19 extends from the top of the shield 81 down from plates 22 and 25 to a point near the bottom of the vessel 15. The electric current is forced down one of the resistance legs 19a and 19b of the heater 19 and back up the other and there is some loss of heat from both ends of the heater 19 by conduction and radiation. Hence, the central portions of the helices 19a and 19b intermediate of the ends thereof are the hottest and the crucible is heated by these central portions, which are spaced close thereto, by radiation of the heat. The exact vertical location of the point of highest temperature depends on the amounts of and locations of heat loss and on variation in the cross-section and resistivity of the helices 19c and 19d of the heater 19 which affect heat generation therefrom. The crucible is so located in the heated zone along the heater 19 that a control temperature can be found, by a pyrometer tube 26, for which the temperature at the top of a melt of semiconductor material, such as germanium or silicon, in the crucible 18 allows the crystal to be grown at an economical rate by extracting heat up the pull rod 42 without freezing occurring at the bottom of the crucible or in the peripheral regions of the top surface of the melt in the crucible by virtue of losing heat at these sites at a greater rate than through the pull rod 42. The crucible supporting elements 17a and 17b reduce heat loss at the bottom of the crucible from conduction and radiation since these supporting elements are composed of high heat resistivity material. The supporting plate 17b also serves to solidify any semiconductor material, which may seep through the crucible bottom, at the immediate point of emergence and thereby seals the bottom of the crucible 18. The thermal shield 81 reduces heat losses from the peripheral top surface region of the crucible 18 and the melt therein from conduction and radiation through the less hot upper portion of the heating element 19. Temperature readings for the assembly can be taken through tube 26 by the usual pyrometer arrangement.

Figure 4:
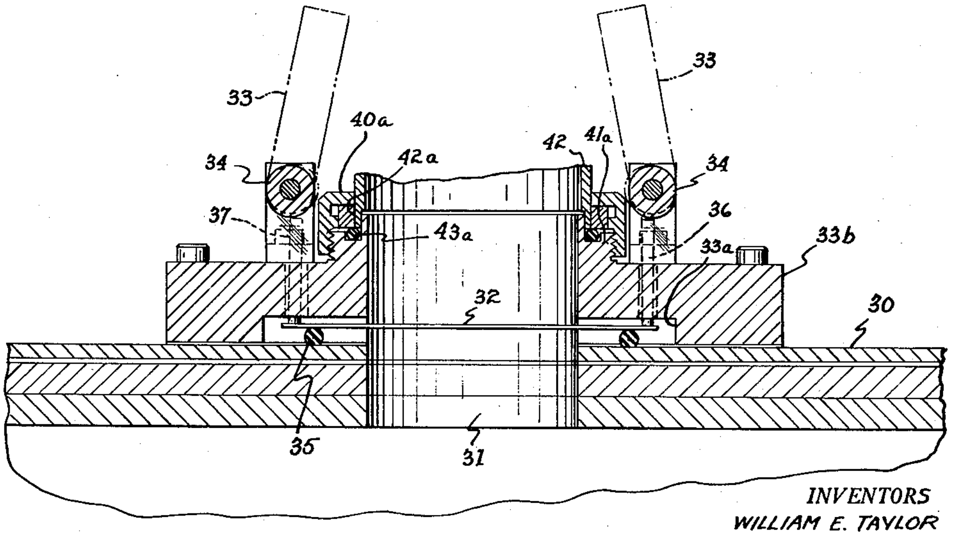
Fig. 4 is an enlarged sectional view taken along the line 4—4 of Fig. 3.

A cover 30 for the outer housing 12 is provided, and this cover is firmly supported in a gas-tight fit over the top of the outer housing by a series of bolts extending around the periphery thereof. The cover 30 has a central port or aperture 31 (Fig. 4) therein which is axially aligned with the crucible 18. A closure member or valve plate 32 for the port 31 is slidably supported on the top of cover 30 in a guideway 33a in a slotted tubular connector or coupling 33b and this closure member can be moved by a pulling rod 28 between an open position and a closed position with respect to the port. A pair of manually operated levers 33 may be rotated to rotate cams 34 to positions pressing push rods 36 and 37 down against the plate 32 to hold it down against a gasket 35 surrounding the port 31 and provide a gas-tight seal for the port 31. The levers 33 also may be rotated to permit the rods 36 and 37 to be spring-pressed up out of contact with the plate 32. An appropriate sight tube 38 is mounted on the cover and a baffle plate 39 of heat resistant material is provided in the furnace and extends horizontally thereacross to protect the underside of closure member 32 from the heat of the heater 19. This baffle has a movable portion 38a, which may be manually actuated by a knob 39a from the top of cover 30 to be moved away from the underside of port 31 when the closure member 32 is in its open position.

The tower or air-lock chamber 40 may be sealed to the top of cover 30 surrounding the port 31, the tower being coaxially aligned with the crucible 18 and the port 31. The tower 40 has a helical water tube 41 extending around its outer periphery for cooling purposes and connected by flexible supply and exhaust conduits 41b and 41c to the source 14a of cooling water under pressure shown diagrammatically in Fig. 1. A coupling nut 40a threadable over a boss 41a of the cover presses a collar 42a of the tower into sealing engagement with a resilient gasket ring 43a to seal the tower to the coupling 33 and the port 31.

Figure 7:
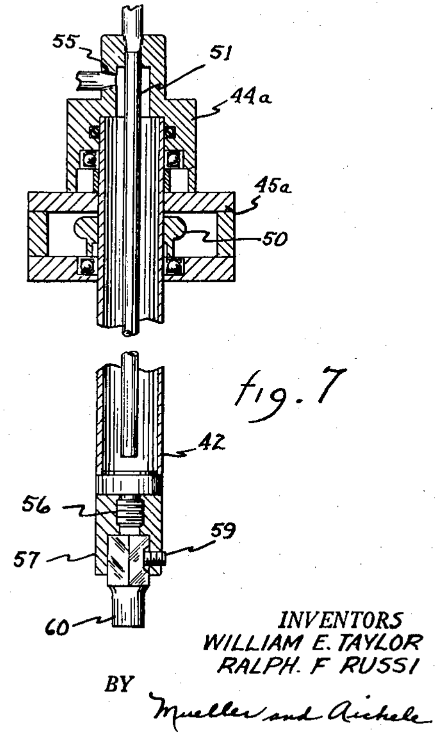
Fig. 7 is an enlarged fragmentary vertical section of the pull rod with a seed holder mounted on the lower end thereof.

The pull rod 42 extends axially down through the tower 40, and is adapted to extend through the port 31 to the molten mass of semiconductor material supported in the crucible 18. The pull rod is rotatable by a motor 43 (Fig. 1) and a known friction drive disc engaging a friction-drivable pinion 50 (Fig. 7). The rotation of the crystal being pulled from the melt in the crucible 18 (Fig. 2) provides temperature equalization to perfect the quality of the crystal being pulled. The motor 43 and the pull rod are mounted on the carriage 44. A rotary-and-thrust bearing 45a (Fig. 1) supports the pull rod 42 on the carriage 44, and also supports a known rotary coupling and seal 44a, which mounts a feed tube 51 in a non-rotating position on the carriage 44. The carriage 44 is raised and lowered by the motor drive 46 and a gear reducer 46a driving the vertical feed screw 45. Energization of motor 46, therefore, imparts vertical rectilinear motion to the pull rod 42 enabling it to be moved down to the molten mass in the crucible 18 and withdrawn therefrom.

Figure 8:
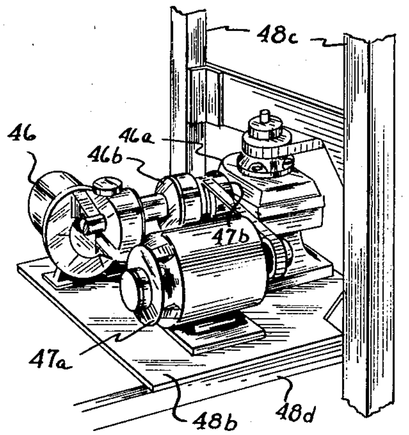
Fig. 8 is an enlarged, fragmentary perspective view of a mechanism for driving the pull rod up and down turned 180° from the position thereof shown in Fig. 1.

A second or high speed motor 47a (Fig. 8) is provided for turning the feed screw 45 much more rapidly than the motor 46 to impart selectively rapid vertical up or down movement to the elevator carriage 44, which is mounted for movement up and down guide channels 48a by roller means 49a. The motors 46 and 47a are connected to the gear reducer 46a through one-way clutches 46b and 47b as is known in the art, and the gear reducer 46a and these motors are supported on a rigidly mounted base 48b positioned below the feed screw 45, and drive the feed screw through a belt 49a. The base 48b is mounted rigidly on rigid vertical corner irons 48c and horizontal stringers 48d. Since the driving elements 46, 46a and 47a are mounted very low in the apparatus, no vibration is imparted to the pull rod 42 by the driving elements 46, 46a and 47. In addition to this stability, the location of the driving elements 46, 46a and 47a also saves overall space of the apparatus.

Figure 6:
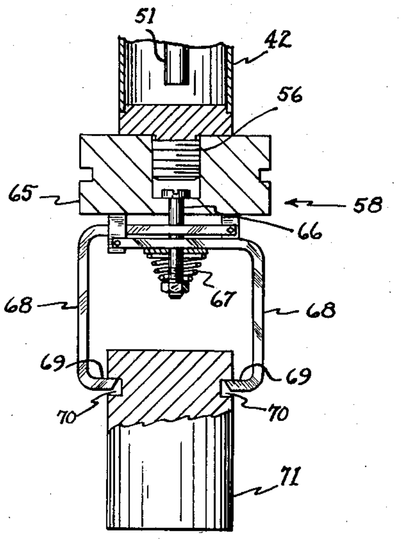
Fig. 6 is an enlarged fragmentary sectional view of a pull rod of the apparatus shown in Fig. 1, with a charge inserting device mounted on the lower end of the pull rod.

The non-rotating feed tube 51 (Fig. 7) has cooling water forced downwardly therein, which flows upwardly in the rod 42 and through an exit port 55 in the coupling 44a. This cools the crystal as it is pulled to expedite the crystal pulling or growing operation. A threaded boss 56 on the bottom of the rod 42 is adapted to have fixed thereto either a seed-holding chuck 57 or a charge-holder 58 (Fig. 6), which are attachable alternately to the pull rod. For purposes of space, in Fig. 7, the central portions of tube 51 for supplying cooling water and the pull rod 42 are broken out and the tower 40 which is on the rod 42 also is omitted, while in Fig. 6 the only portion of the pull rod shown is the lower end thereof. The chuck 57 has a set screw 59 for locking a crystal seed 60 of semiconductor material against axial and/or rotary movement relative to the pull rod 42. The charge-holder 58 has a nut 65 threadable over the boss 56, and supports a screw 66 carrying a compression spring 67 pressing pivotal tongs 68 in directions in which hook portions 69 are urged gently apart. The hook portions 69 are designed to enter opposed bores 70 in an ingot 71 of semiconductor material such as germanium or silicon, and be frictionally held in the bores 70 so long as the weight of the ingot bears against the hook portions 69. However, when the weight of the ingot is removed from the hook portions 69, the spring 67 forces them out of the bores 70 so that the charge-holder 58 is, in effect, a releasable chuck.

A flexible supply line 75 (Figs. 1 and 2) leading from a supply 75*a* of inert gas, argon in the present instance, under a slight pressure supplies this gas as desired to the interior of the tower through a port 76, and the gas is exhausted from the tower by a flexible exhaust line 96. The gas supply 75*a* also supplies the inert gas under a slight pressure through a supply line 91 to the furnace 9 to keep it filled with the gas. An exhaust line 92 permits a slight flow of the gas from the furnace. The upper end of the tower has a bore 77 therein for the pull rod 42 to rotate and move vertically, and a resilient sealing ring 78 seals the rod 42 hermetically to the tower 40. The bore 77 acts as a rotary bearing for the elongated pull rod 42 and is directly under the bearing 44*a* to steady the pull rod as it is rotated. A pivotal latch 95 on the elevator carriage 44 is designed to be moved over a pin 97 on the tower to hold the tower in a raised position relative to the furnace 9.

*Operation*

Figure 3:
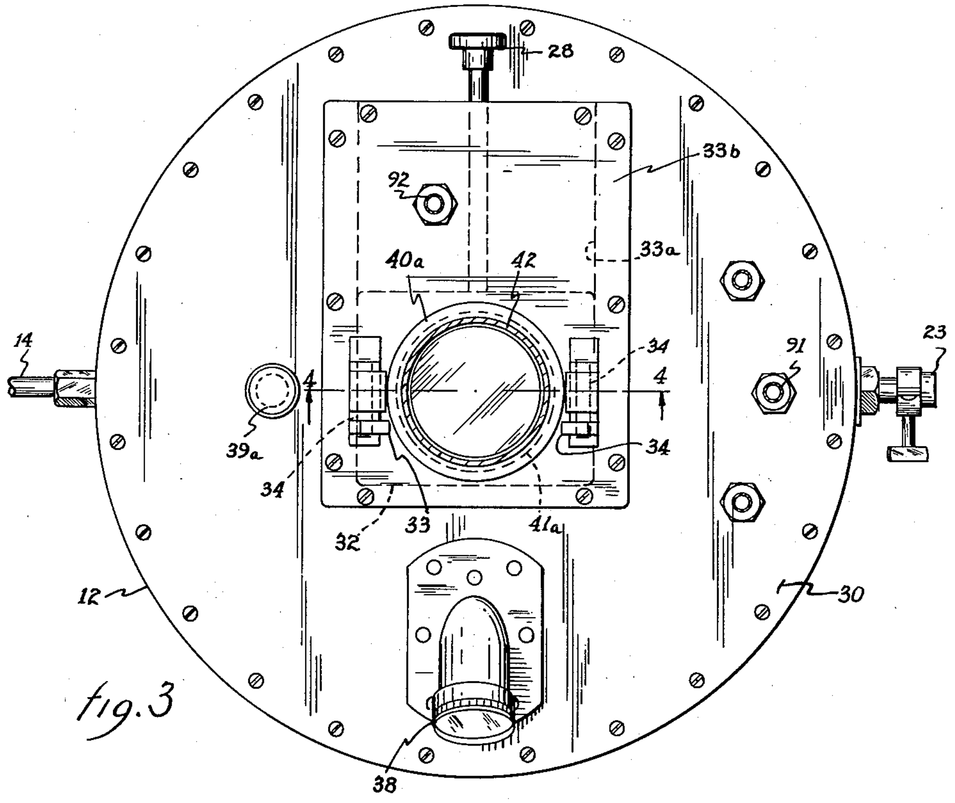
Fig. 3 is a top plan view of the furnace portion.

One or more relatively pure charging ingots 71 of germanium and an impurity-doped pellet are placed in the crucible 18 (Fig. 2), the closure member 32 (Figs. 3 and 4) is slid manually along the guides 33*a* to a position closing the port 31, and the levers 33 are actuated manually to cam the rods 36 and 37 downwardly so as to force the member 32 into hermetically sealing engagement with the sealing gasket 35. The shield 38*a* is moved to cover the member 32. Then the interior of the furnace is filled with inert gas such as, for example, argon, from the source 75*a* (Fig. 1) of gas under pressure, air being exhausted through the exhaust line 93. Then voltage is applied to the heater 19 and the contents of the crucible are brought to a suitable crystal-pulling temperature. Meanwhile, the holder 57 (Fig. 7) with the seed 60 is secured to the rod 42, the pivotal latch 95 is disengaged manually from the pin 97 on the tower 40, the tower is lowered on the pull rod 42 to the port 31 (Fig. 4), and the coupling nut 40*a* is screwed onto the boss 41*a* to seal the tower hermetically to the cover 30. Then the supply line 75 (Fig. 1) is connected to the inert gas source 75*a* by a suitable valve (not shown) to fill the tower 40 with the inert gas under a slight pressure, the air being flushed out before the nut 40*a* is turned down tight. The nut 40*a* is tightened to seal the tower to the port. Then the levers 33 (Fig. 2) are swung apart to permit the spring-pressed plungers 36 and 37 to lift away from the member 32 which is slid back away from the port 31. The knob 39*a* is actuated to withdraw the baffle or shield 38*a*. Cooling water is turned on to the pull rod 42 and the coil 41 of the tower 40.

When the furnace has been brought up to its desired pulling temperature with the germanium in the crucible 18 molten and at the pulling temperature, the motors 47*a* and 46 (Fig. 1) are actuated sequentially to lower the carriage 44 and the pull rod to insert the lower end of the crystal seed 60 into the melt. The seed 60 is kept cooler than the melt by the water-cooled pull rod 42, and the germanium of the melt begins to crystallize on the lower end of the seed. The motor 43 operates continuously to turn the pull rod 42 slowly to equalize temperature as the crystallization occurs, and the motor 46 turns the screw 45 to slowly raise the pull rod as the crystal from the melt forms.

The crystal is pulled until about one-third of the entire melt has been crystallized thereon, the impurity concentration being very uniform along the crystal since only the small fraction of the melt is pulled. Then the motor 47*a* is started to lift the carriage 44 and the pull rod 42 until the crystal is entirely in the tower 40. The port 31 is then sealed off by the valve plate 32, the crystal in the tower is cooled to a non-oxidizing temperature, and the tower 40 is disconnected from the boss 41*a* and is slid up the pull rod and latched in that position by the latch 95, thereby making the crystal and the lower end of the pull rod accessible. The operator then removes the holder 57 from the pull rod, and substitutes the charge-holder 58 on the pull rod.

The ingot or charge 71 (Fig. 6) of the same purity as the crystal is then suspended from the holder 58 by manually pressing the hooks 69 of the tongs 68 into the holes 70, letting the hooks support the ingot and holding the hooks in their closed positions by the weight of the ingot thereon. The tower is then lowered and sealed to the cover 30, the interior of the tower is filled with argon, the valve plate 32 is slid back to open the port 31, and the baffle 38*a* moved back. If there is only a shallow melt left in the crucible, the motor 47*a* is actuated to lower the pull rod and ingot until the lower end of the ingot enters the residue of the melt and engages the bottom of the crucible. This removes the load on the tongs 68, the hooks 69 of which then are pressed apart by the spring 67 to release the ingot in the crucible. If the residue of the previous melt is deep enough that the melt would contact the tongs 68 before the ingot engaged in the bottom of the crucible, the furnace temperature is lowered sufficiently to freeze the previous melt sufficiently to form a crust that will support the weight of the ingot, and then the ingot is lowered and is released from the tongs 68 as this crust is engaged by the ingot.

After placing the ingot in the crucible, the pull rod 42 is withdrawn from the furnace, the port 31 is sealed off, and the tower is slipped up the rod 42 and latched in its upper position. The charge-holder 58 is removed from the rod 42, and the holder 57 with a new seed 60 of precisely oriented crystal structure is mounted on the rod. Then the operation described above is repeated to grow another crystal. In producing n-type germanium crystals with the above described apparatus in a typical operation, approximately 2500 grams of a mixture of highly purified germanium and a small chosen amount of antimony (either in its pure state or in a high concentration of antimony in germanium) is introduced into the crucible 18. The contents of the crucible are heated to the melting temperature of the germanium, about 937° C., and the antimony distributes itself through the germanium. Then the controller associated with the thermocouple 26 brings the temperature of the melt up to a temperature at which the thermocouple 26 is about 25° C. hotter than it is when the germanium is just at its melting point. The original concentration of antimony in the germanium is about $2.4 \times 10^{-4}$ weight percent of the melt and enough of the antimony is vaporized or otherwise lost during the melting operation to bring the percentage of the antimony by weight in the melt to about $1.5 \times 10^{-4}$, though this may be within the range of from about $1.1 \times 10^{-4}$ to about $1.9 \times 10^{-4}$ percent. Then, the lower end of the seed 60, which is a single crystal of germanium, is immersed into the melt and the lower face of the seed is melted to provide a clean unoxidized growing face. To pull a crystal for subsequently making alloy junction transistors, the lower end or face of the seed 60 is preferable parallel with the Miller (111) crystallographic planes.

Then, the temperature of the melt is lowered to a temperature at which the portion of the melt at the interface between the crystal and the melt is still molten but just at the melting point of the melt. After this, the pull rod 42 is rotated at about 30 revolutions per minute and is lifted at about four inches per hour. The doped germanium crystallizes initially on the seed 60 and then on the grown portion as the rod is lifted away from the melt. The pulling is continued until the desired length of crystal is formed, at the end of which time the crystal is withdrawn from the furnace as described above. The resistivity of the crystal varies inversely with the doping impurity concentration thereon. Since all of the doping impurity in each increment of the melt crystallizing on the bottom of the crystal does not crystallize but some of the impurity stays in the melt, the concentration of the impurity in the melt increases as the pulling proceeds. Hence, the concentration of the impurity in the crystal continuously increases as the length of the crystal increases, this increase in concentration is exponential rather than linear. Hence, the pulling is stopped when only a small fraction, preferably one-third, of the total melt has been formed into the crystal. For a pulling period of about two hours, the crystal so produced is very large and quite perfect, being about eight inches long and weighing about 800 grams, and the resistivity along its lengtth does not decrease more than 15% from the starting end of the crystal to the terminating end thereof. And none of the crystal is unusable because of resistivity variation.

Then, a fresh charge of germanium, preferably doped with antimony slightly less than the original charge, is introduced into the melt to replenish it and lower its antimony concentration to about $1.5\times10^{-4}$ weight percent for pulling the next crystal. The reason for introducing the less highly doped replenishing charge is that the portion of a particular melt which has been crystallized or pulled always has a smaller dope concentration than the portion of the material still in the melt. So, the residue at the end of a melt, or if desired, at the end of a series of melts, requires a replenishing charge more lightly doped than the initial starting material to keep the dope concentration from varying widely. Since the amount of the semiconductor material crystallized for each crystal from the melt is only about one-third of the melt, the concentration of the antimony along the length of the crystal varies only slightly. The reproducibility from crystal to crystal in size, resistivity and quality is excellent.

The invention provides, therefore, a new and improved furnace assembly and method that produce superior crystals of very large size with minimum waste and provides through the air-lock 40 convenient and essentially continuous crystal pulling without the need for closing down and cooling the furnace between successive operations. Since only a small fraction of the melt is pulled for each crystal, the resistivity of each crystal does not vary widely along the length of the crystal. Also, since the support **17*b* stops seepage of the melt through the crucible 18, the very large charge of semiconductor material may be used with quite small size of the crucible 18. The heater 19 is spaced closely to the crucible 18 and to the shield 81 so that these elements keep the germanium melt and the portion of the furnace above the melt surrounded by the shield 81 at optimum temperatures for the crystal-pulling operation. The cup-shaped vessel 15 also confines the heat from the heater 19 to prevent loss therefrom, and the plate 17*b* and the cylinder 17*a* precisely locate the crucible 18 adjacent to the hottest portion of the heater 19. The arcuate electrode plates 22 and 25 provide a rugged mounting structure for the heater 19** and also form low-resistance electrical conductors to the heater.

We claim:

1. Apparatus for producing semiconductor crystals and the like which comprises a furnace having a port in the top thereof, a vertically extending pull rod supported in a position above the furnace movable into and out of the furnace through the port for alternately carrying a semiconductor crystal and a charge of semiconductor material, a vertically extending tower slidable on the pull rod between a raised position in which the lower end of the pull rod is exposed and a lowered position in which the lower end of said tower is seated on the furnace, securing means for holding said tower in said raised position, releasable means for sealing the lower end of the tower to the top of the furnace in a position covering the port, means sealing the upper end of the tower to the pull rod, selectively operable valve means carried by the furnace for opening and closing the port, clamping means for applying pressure to said valve means to provide a gas tight seal for said port, with said valve means in closed position and said tower defining an enclosed space for confining a crystal withdrawn from said furnace, and cooling means for cooling the crystal in the enclosed space independently of the material in said furnace.

2. A crystal producing apparatus which comprises a vertical furnace having a top cover provided with a port, and a gasket surrounding said port, valve means including a plate slidable along the bottom of the cover for opening and closing the port, quick release clamping means including cam actuated plungers engageable with said plate to force the same against said gasket thereby providing a gas-tight seal over said port, said cover having quick-detachable connector means on the exterior thereof in position surrounding the port, a pull rod supported for movement in and out of said port, a hollow cylindrical tower having coupling means at its lower end for securing the tower to the connector means, said tower also having sealing means at the upper end thereof for engaging the pull rod, said tower and said slidable plate in its closed position defining an enclosed space for confining a crystal withdrawn from said furnace, and cooling means for cooling the crystal in the enclosed space independently of material in said furnace.

3. Apparatus for producing elongated semiconductor crystals having limited resistivity variation from one end to the other, said apparatus including in combination, a helical resistance heater providing a zone of maximum heat in a central region within said heater, a crucible for containing molten semiconductor material in an amount substantially in excess of that required to form a crystal of predetermined size, supporting means for holding said crucible at said region of maximum heat within said heater, said supporting means including a plate in face to face contact with the bottom of said crucible and outside of said region of maximum heat such that said plate is effective to freeze molten semiconductor material seeping from said crucible and thereby seal said crucible against further seepage, and outer housing, means forming an opening in said housing aligned with the open end of said crucible, a valve plate slidably positioned above the open end of said crucible, a gasket positioned to cooperate with said valve plate to seal said crucible and the space around it from the ambient atmosphere, quick-release clamping means engageable with said plate to force the same against said gasket, an annular connector carried on said outer housing around the opening, a vertically adjustable tower open at one end, coupling means carried on said one end of said tower and adapted to seal said tower to said connector, a vertical pull rod extending down through said tower, means for attaching a chuck to one end of said pull rod, means for imparting vertical motion to said pull rod to lower a seed crystal attached to the chuck into the molten material in said crucible and to withdraw a crystal therefrom to a position above said outer housing with said valve plate in the open position, means for cooling said tower so that with said valve plate in the closed position said valve plate and said tower define a chamber which can be cooled independently while the semiconductor material in said crucible is maintained in molten condition, and means for supporting said tower in a position spaced from the top of said outer housing to afford access to said end of said pull rod.

4. Crystal pulling apparatus for producing elongated semiconductor crystals having limited resistivity variation from one end to the other, said apparatus including in combination, a furnace housing having an upper side with a port therein, a gasket surrounding said port, a cover extending over said port and having an opening therein aligned with said port, a valve plate slidable under said cover between a position in which said port is open and a position in which said plate is seated on said gasket and closes said port, quick-release clamping means including cam actuated plungers movable through said cover to engage said valve plate and force the same against said gasket, thereby providing a gas-tight seal for said port, quick-detachable connector means on the exterior of said cover surrounding said opening therein, a cylindrical tower having a coupling portion on the lower end thereof cooperable with said quick-detachable connector means to seal said tower in sealed relation with said cover, a vertical pull rod extending down through said tower and movable through said tower in and out of said furnace housing for alternately carrying a charge of semiconductor material to the interior of said housing and removing a semiconductor crystal from said housing into said cylindrical tower, said tower having means on the upper end thereof in sealed relation with said pull rod such that when said valve plate is positioned and clamped on said gasket said tower provides a gas-tight enclosure for receiving the charge of semiconductor material and the semiconductor crystal without exposing the interior of said furnace to the ambient atmosphere, said tower being slidable vertically along said pull rod to a raised position spaced from the upper side of said housing to afford access to the lower end of said pull rod, means for holding said tower in said raised position, a crucible positioned within said housing in alignment with said rod, means supporting said crucible including a plate contacting the bottom of said crucible for freezing semiconductor material which seeps through said crucible, a helical electrical resistance heating element surrounding said crucible and positioned to subject said crucible to the maximum heat provided by said heating element, and thermal shielding means for confining the heat supplied by said heating element within said furnace housing.

References Cited in the file of this patent

UNITED STATES PATENTS

| | | |
|---|---|---|
| 158,312 | Read | Dec. 29, 1874 |
| 2,214,976 | Stockbarger | Sept. 17, 1940 |
| 2,402,582 | Scaff | June 25, 1946 |
| 2,446,403 | Bassereau | Aug. 3, 1948 |
| 2,475,810 | Theuerer | July 12, 1949 |
| 2,683,676 | Little et al. | July 13, 1954 |
| 2,686,212 | Horn | Aug. 10, 1954 |
| 2,727,840 | Teal | Dec. 20, 1955 |
| 2,753,280 | Moore | July 3, 1956 |
| 2,768,914 | Buehler | Oct. 30, 1956 |
| 2,793,103 | Emeis | May 21, 1957 |
| 2,822,308 | Hall | Feb. 4, 1958 |
| 2,851,341 | Weiss | Sept. 9, 1958 |
| 2,851,342 | Bradshaw | Sept. 9, 1958 |

FOREIGN PATENTS

| | | |
|---|---|---|
| 201,180 | Australia | Nov. 18, 1954 |